L. A. GREENE.
AGRICULTURAL IMPLEMENT.
APPLICATION FILED MAY 17, 1920.

1,403,547.

Patented Jan. 17, 1922.
4 SHEETS—SHEET 1.

WITNESSES

INVENTOR
L. A. GREENE,
BY
ATTORNEYS

L. A. GREENE.
AGRICULTURAL IMPLEMENT.
APPLICATION FILED MAY 17, 1920.
1,403,547.
Patented Jan. 17, 1922.
4 SHEETS—SHEET 2.
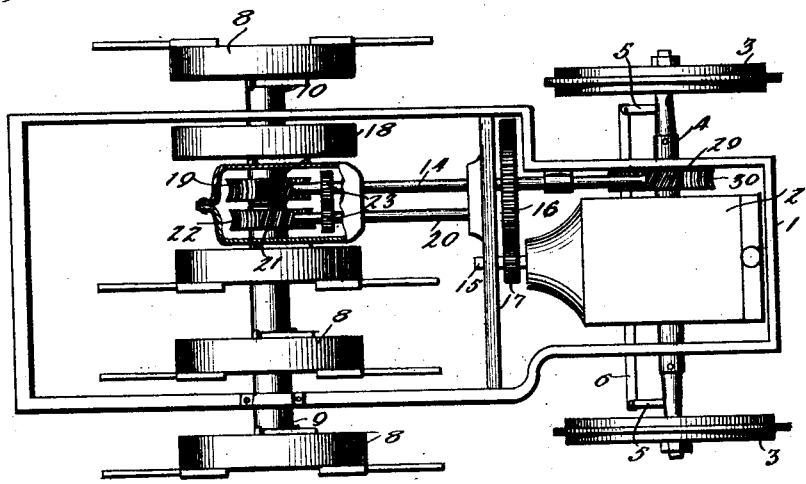
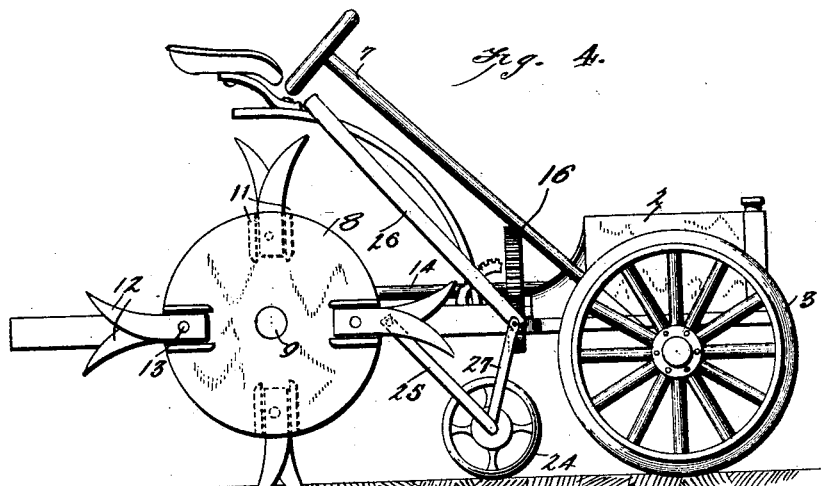

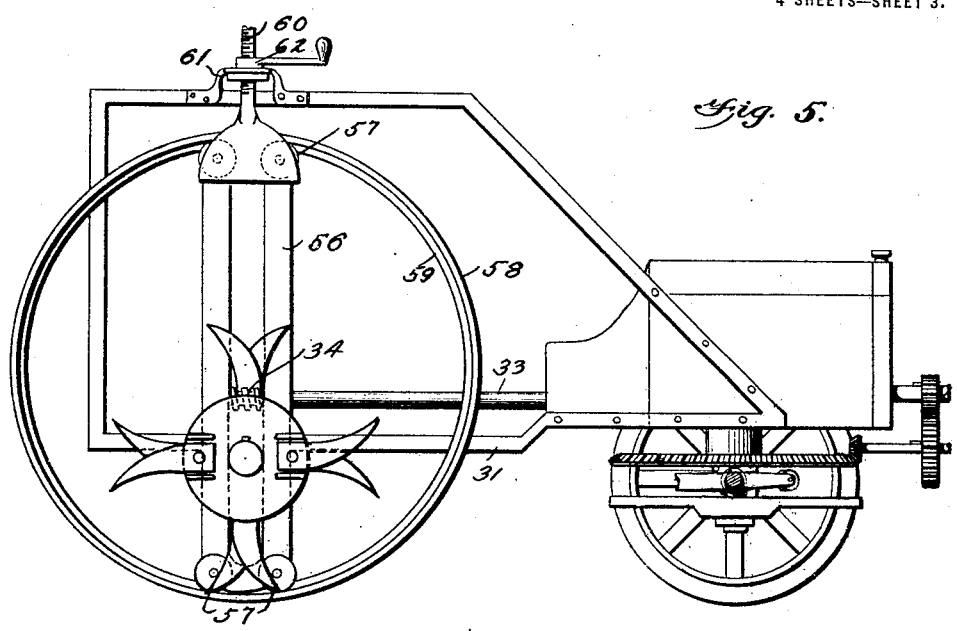
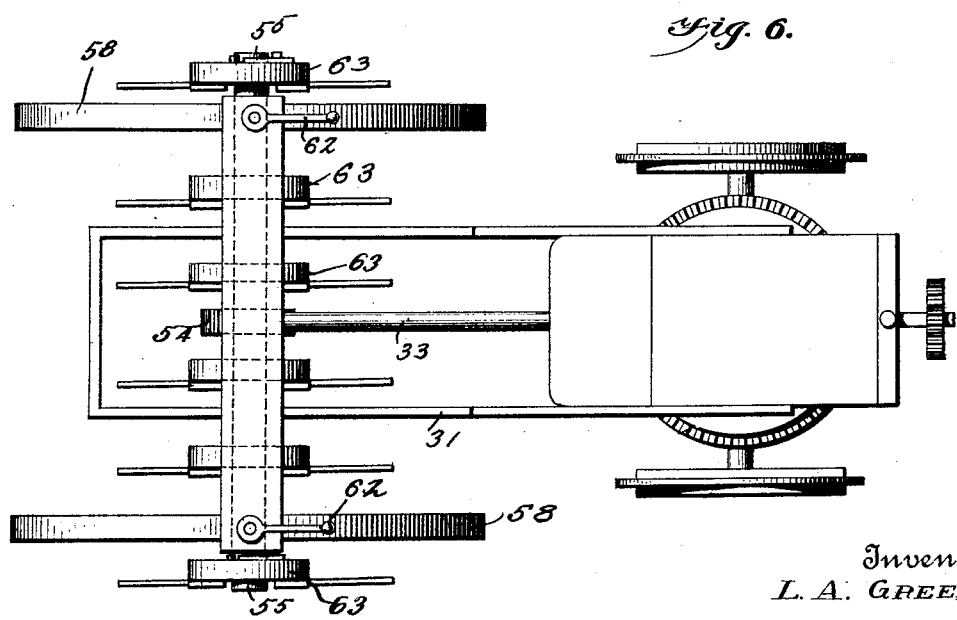

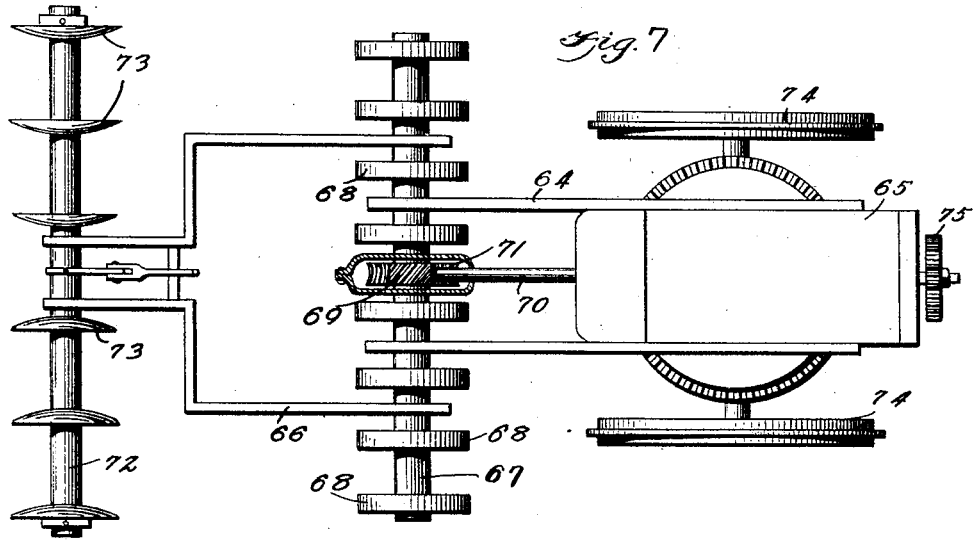
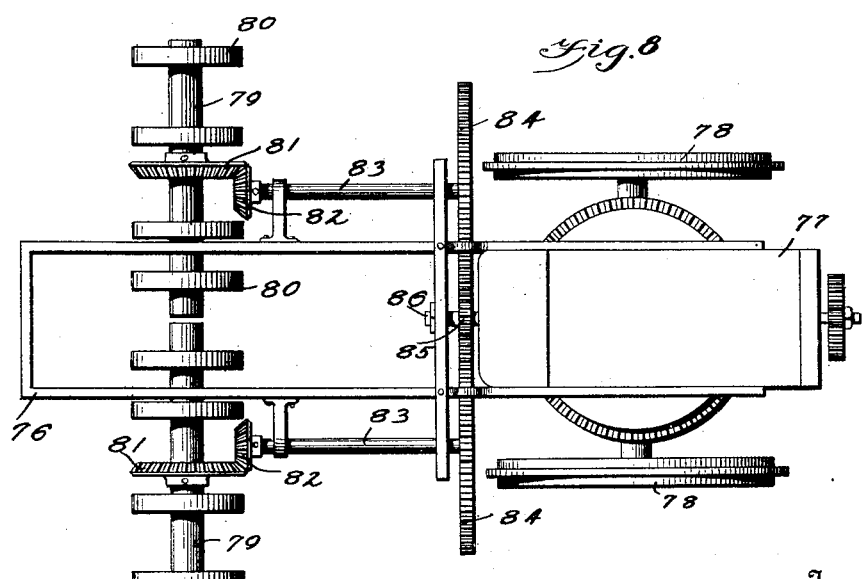

UNITED STATES PATENT OFFICE.

LEMUEL A. GREENE, OF GREENVILLE, SOUTH CAROLINA.

AGRICULTURAL IMPLEMENT.

1,403,547.  Specification of Letters Patent.  Patented Jan. 17, 1922.

Application filed May 17, 1920. Serial No. 381,913.

*To all whom it may concern:*

Be it known that I, LEMUEL AUSTIN GREENE, a citizen of the United States, and a resident of Greenville, in the county of Greenville and State of South Carolina, have invented certain new and useful Improvements in Agricultural Implements, of which the following is a specification.

My invention is an improvement in agricultural implements, and has for its object to provide an implement of the character specified, wherein a supporting frame is made use of, and rotatably mounted tool supports, together with a motor for driving the frame and the tool supports, the said supports being arranged in series, one upon each side of the frame, and connected to the motor in such manner that they are driven in opposite directions, one series acting as propellers, soil pulverizers and plant cultivators, and the opposing implements doing the same work in the opposite direction enabling an extremely light motor to equalize the strong propellers and regulate the speed, and wherein the cultivating mechanism cuts the soil backward to force the light frame forward.

In the drawings,

Figure 3 is a top plan view,

Figure 4 is a side view looking at the opposite side from Figure 1,

Figure 5 is a side view of another embodiment of the invention,

Figure 6 is a top plan view,

Figures 7 and 8 are top plan views of other embodiments of the invention.

Figure 1:
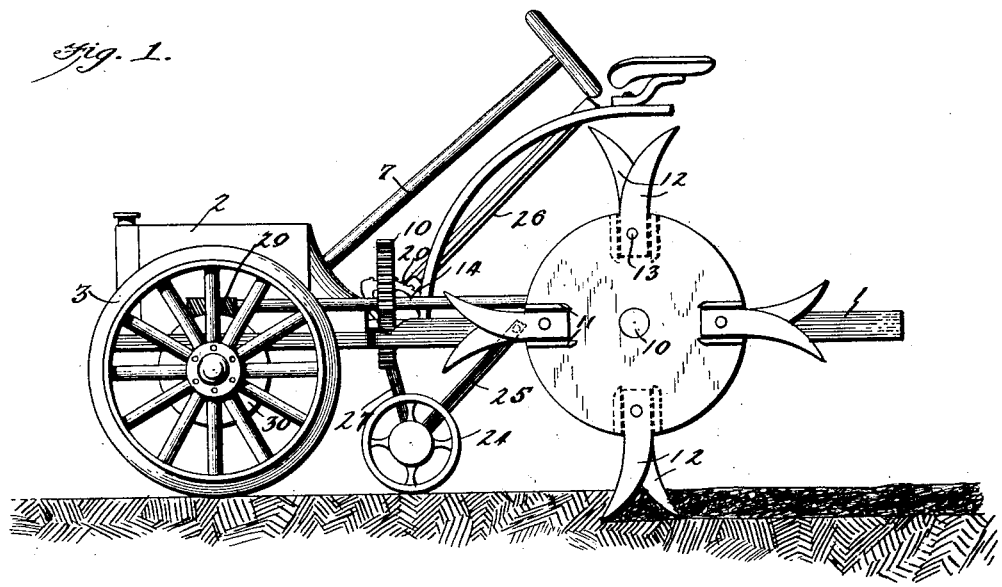
Figure 1 is a side view of the improved implement, with parts broken away.

In the present embodiment of the invention, a suitable support 1 is provided in the form of an open substantially rectangular frame. This support carries a motor 2 at the front end, the support being reduced laterally at each side at the said end, the said end being supported by wheels 3, which are arranged on spindles mounted to swing on the ends of an axle 4 upon which the frame 1 is mounted. These spindles have steering arms 5, which are connected by a connecting rod 6 and a steering shaft 7 is connected to the rod 6 in the usual manner, for simultaneously swinging the wheels 3 to steer the supporting frame.

Referring to Figure 3, it will be seen that each of the wheels 3 has an annular radial rib on its peripheral surface which assists traction, and prevents side slipping of the wheels. The earth-treating mechanism consists of a plurality of series of disks 8, all of which are alike, and the disks of each series are secured to the shaft, the disks at the right of the frame being secured to a shaft 9, while those at the left are secured to a shaft 10, and the shafts 9 and 10 are journaled on the frame in alinement with each other.

Referring to Figure 3, it will be seen that the shaft 9 has three disks while the shaft 10 has two, and each shaft has one disk outside the frame, the rest being inside the frame. It is obvious that the number of disks on each shaft might be varied. All of the disks 8 have radial guideways 11, each guideway consisting of two ribs spaced apart from each other, and the earth-treating tools, indicated at 12, are held in these guideways.

In the present instance each of these tools is curved longitudinally, having a portion fitting between the guideways and secured to the disk by a bolt 13, and a portion which is curved with respect to the portion held in the guideway. The said last named portion of each tool is formed to provide a cutting edge, and each disk in the present instance has four tools, the said tools being arranged at intervals of ninety degrees to each other. The arrangement of the tools on the shafts may vary with respect to the shaft, as, for instance, all of the tools may be in register, or they may be staggered as may be found desirable.

The shafts 9 and 10 are driven in opposite directions from the motor, by means of a transmission shaft 14, which is connected to the motor shaft 15, by a gear wheel 16 and a pinion 17, the gear wheel being mounted on the shaft 14, while the pinion is mounted on the motor shaft. The shaft 14 is journaled on the frame, and it is provided at its rear end with a worm 18 which meshes with a worm wheel 19 on the shaft 10.

A counter shaft 20 is journaled on the frame parallel with the shaft 14, and this shaft 20 has at its rear end a worm 21 which meshes with a worm wheel 22 on the shaft 9. The shafts 14 and 20 are geared together by gearing 23, in such manner that they rotate at different suitable speed. It will be obvious that when the motor shaft is driven, the shafts 9 and 10 will be rotated at different speeds and in opposite directions. That series of earth-treating implements which is rotating forwardly to cause the tools to cut backwardly will drive the machine forwardly.

Under ordinary circumstances, a considerable weight would be necessary to hold these tools in the ground, that is, to cause them to cut. By arranging the other series of tools in such manner that they will act accordingly, I may greatly lighten the frame and machine as a whole, since it is not necessary that I provide sufficient weight to hold the tools in engagement with the ground. That series of tools which is rotating backwards, acts as resistance, and by varying the relative speed of the two shafts, which may be easily done by the gearing connection 23, the extent of resistance may be nicely adjusted to suit conditions.

In order to prevent the cultivating mechanism sinking into the soil, beyond a predetermined depth, and to support the cultivator mechanism out of contact with the soil during transportation, a wheel 24 is provided. This wheel is journaled on the rear end of a link 25, which is pivoted at its forward end to the frame, and extends rearwardly and downwardly. The rear end of the link is connected to a lever 26 by means of a link 27, and the lever has latch mechanism 28 cooperating with a toothed quadrant for holding the lever in adjusted position.

The shaft 14 is extended forwardly to the front axle, and at this point is provided with a worm 29 which meshes with the worm wheel 30 on the front axle for driving said axle. The construction of the front axle is the usual construction in front wheel drives.

In the embodiment of the invention shown in Figures 5 to 11 inclusive, a supporting frame 31 is provided having arranged at the front thereof the motor 32 of any suitable construction, and the shaft 33 of the motor is provided at its rear end with a worm 34 which drives the traction mechanism to be later described.

As before stated, the motor shaft 33 extending rearwardly from the motor has a worm 34 which meshes with a worm wheel 54 on a rear axle 55 journaled on the frame 31. The ends of this axle are extended beyond the frame as shown, and pass through vertical slots or passages in guides 56 arranged at the opposite sides of the frame near its rear end. Each of these guides carries a pair of grooved wheels 57 at each end, the said wheels being arranged at the corners of the frame and at opposite sides of the vertical slot in the frame through which the axle end extends.

These wheels of each frame engage within a traction or tread ring 58 which is of a diameter such that the guides 56 will fit diametrically of the ring. The traction or tread ring 58 has an internal circumferentially extending rib 59 which engages within the grooves of the wheel, and prevents movement of the ring laterally with respect to the frame 56 and the wheels.

The frames 56 are moved upwardly or downwardly with respect to the frame 31 by means of screws 60 which are connected with the tops of the frames and which extend upwardly through bearings brackets 61 on the frame, and are engaged by handle nuts 62 above the bracket.

Figure 2:
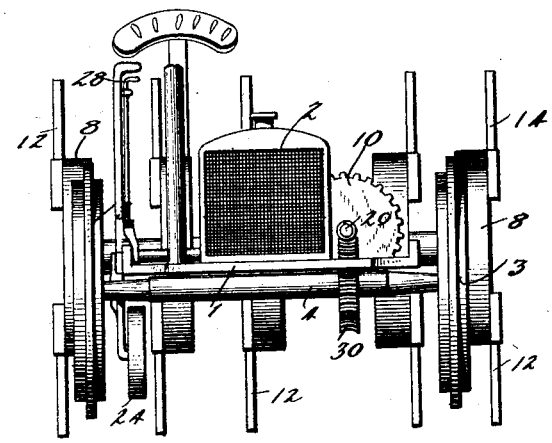
Figure 2 is a front view.

It will be obvious that by turning the nut in the proper direction, the frames may be raised and lowered or rather the frame 31 may be moved vertically at its rear end with respect to the rings 58. The axle 55 carries disks 63 which support earth treating tools of the character shown in Figures 1 to 4, and arranged in a similar manner.

In the embodiment of the invention shown in Figure 7, the frame consists of a forward section 64 which carries a motor 65 and a rear section 66 which carries a bracket to be later described. The axle 67 which carries the disk 68 corresponding to the disks 63 of Figures 5 and 6, is mounted between the two sections, the said sections being mounted on the axle at their meeting ends. This axle 67 is driven by a worm 69 on the motor shaft 70, which meshes with a worm wheel 71 on the axle. The axle 72 carries a series of concavo-convex disks 73 which, by their engagement with the soil, and their action thereon, serve as a drag to hold the cutting tools at the proper depth in the ground. The front wheels 74 are driven by gearing 75.

In the embodiment of the invention shown in Figure 8, the frame 76 carries the motor 77, which is connected to the front wheels 78 in the same manner as described for Figures 5 and 6, the rear end of the frame being supported by the axle 79 which carries the disks 80 corresponding to the disks 68. The axle 79 carries also bevel gear wheels 81 which mesh with bevel pinions 82 on shafts 83 journaled at the outer sides of the frame 76. The forward ends of these shafts 83 have gear wheels 84, which mesh with gear wheel 85 on the motor shaft 86. The axle 79 is sectional, one of the bevel gear wheels 81 being secured to each section, and it will be evident that the sections will be driven in opposite directions by the shafts 83. Thus one half of the cultivating mechanism carried by the device will be driven forwardly and the other half rearwardly, and the one half will act as a drag on the other half to regulate the depth of cut of the machine.

It will be evident that the improved implement cuts always toward the ground already loosened instead of cutting toward the ground not loosened as in those implements which cut forwardly, as for instance a plow or cultivator. With the present construction, the cutting is rearwardly toward the ground already cut.

I claim:

1. An agricultural implement comprising a supporting frame having traction wheels at the front thereof, an axle journaled transversely of the rear of the frame and carrying earth treating elements, supporting rings for the rear end of the frame, each ring having arranged diametrically thereof and in vertical position a frame on which the ring is journaled to move, and a connection between each frame and the implement frame for raising and lowering said ring engaging frame.

2. An agricultural implement comprising a supporting frame, wheels for supporting and guiding the frame at one end, a series of rotary earth treating elements at the opposite end, and means for supporting the frame at the said end and for adjusting it vertically, said means comprising traction or tread rings, frames journaled in the rings and upon which frame said rings move, and means for moving said frames vertically.

LEMUEL A. GREENE.